United States Patent
Bovenschen et al.

Patent Number: 5,817,974
Date of Patent: Oct. 6, 1998

[54] CABLE WRAPPING

[76] Inventors: Dirk Albertus Bovenschen, De Meent 2, Renswoude, Netherlands, 3927 GM; Petrus Govardus Johannes Vogel, Planterslaan 50, Leersum, Netherlands, 3956 VX; Rintsje Sybolt de Boer, Engelandlaan 272, Haarlem, Netherlands, 2034 NJ

[21] Appl. No.: 433,352
[22] PCT Filed: Sep. 6, 1994
[86] PCT No.: PCT/NL94/00215
§ 371 Date: May 4, 1995
§ 102(e) Date: May 4, 1995
[87] PCT Pub. No.: WO95/07539
PCT Pub. Date: Mar. 16, 1995

[30] Foreign Application Priority Data

Sep. 6, 1993 [NL] Netherlands ............ 9301531

[51] Int. Cl.$^6$ .............. H01B 7/18; H01B 11/06
[52] U.S. Cl. ............ 174/36; 174/106 R; 174/124 R
[58] Field of Search ............. 174/36, 102 R, 174/106 R, 107, 102 SP, 103, 121 R, 124 R

[56] References Cited

U.S. PATENT DOCUMENTS

| | | | |
|---|---|---|---|
| 4,318,719 | 3/1982 | Kato et al. | 55/147 X |
| 4,595,793 | 6/1986 | Arroyo et al. | 174/121 A X |
| 4,749,625 | 6/1988 | Obayashi et al. | 428/624 X |
| 4,761,520 | 8/1988 | Wade, Jr. et al. | 174/121 R X |
| 4,822,950 | 4/1989 | Schmitt | 174/36 |
| 4,957,883 | 9/1990 | Kobayashi et al. | 501/35 X |
| 5,010,209 | 4/1991 | Marciano-Agostinelli et al. | 174/23 C |

FOREIGN PATENT DOCUMENTS

| | | |
|---|---|---|
| 0049104 | 4/1982 | European Pat. Off. . |
| 0151448 | 8/1985 | European Pat. Off. . |
| 9201651 | 5/1995 | Germany . |

*Primary Examiner*—Kristine L. Kincaid
*Assistant Examiner*—Chau N. Nguyen

[57] ABSTRACT

A conductive fiber cloth including a conductive fibrous material and optionally a water-swellable material and/or a non-conductive, optionally reinforcing, fibrous material, is used as a cable wrapping. The water-swellable material is provided on and/or in the fiber cloth. The cable wrapping, provides conductance, shielding, or a combination of the two, in a cable.

8 Claims, 1 Drawing Sheet

CABLE WRAPPING

BACKGROUND OF THE INVENTION

This invention relates to the manufacture of cables and more specifically to the use of electrically conductive cable wrapping in the manufacture of cables.

The use of conductive wrappings in cables is known. In the manufacture of power cables, conductive wrapping is used in the screen range, in order to provide for a good electrical contact between the core screen, the metal screen and the metal water barrier, if any is present. In this type of cable wrapping it is only important that volume conductivity is provided in the wrapping.

In signal cable, conductive cable wrapping is used to obtain 'shielding' in the cable, i.e. a shielding from electromagnetic interference from the outside to the inside and/or from the inside to the outside.

The nature and structure of such types of cables are different, which is also apparent from the requirements imposed on the cable wrapping. For power cable, there is a need for thick wrapping which swells strongly and is properly conductive. For signal cable, on the other hand, it may suffice to use a wrapping that does not swell quite so strongly and which is preferably thin.

Well known are types of cable wrapping which are built up from a fibrous web (non-woven) which has been impregnated with conductive carbon black. In particular in the case where the wrapping must impart to the cable not only conductive properties but also longitudinal water impermeability, a problem arises in that the conductive properties sometimes are exhibited insufficiently.

A disadvantage of the use of conductive carbon black is that carbon black is noble in comparison with the metals which are present in cables. This means that galvanic corrosion of conductors and/or the screen can arise, which is undesirable.

SUMMARY OF THE INVENTION

The object of the invention is to provide a conductive cable wrapping, which may optionally comprise a water-swellable material, to which wrapping have been imparted in a simple manner suitable conductive properties, such as volume conductance and/or shielding, while a number of disadvantages of the prior art do not arise or arise to a minor extent only.

The invention is based inter alia on the surprising insight that it is possible to provide a network by which electrical conduction and/or shielding are obtained in a cable by the use of conductive fibers, for instance in the form of a blend of non-conductive fibers and conductive fibers, optionally in combination with a water-swellable material, or by an assembly of a conductive and a non-conductive cloth which have been bonded onto each other.

The invention accordingly relates inter alia to the use of a conductive fiber cloth comprising at least one conductive fibrous material, as cable wrapping for providing conductance, shielding, or a combination of the two in a cable.

Surprisingly, it has been found that such a conductive cloth is highly suitable for imparting conductive and/or shielding properties to power or signal cable. By the use of conductive fibers in the wrapping, the undesired galvanic corrosion caused by carbon black does not arise or arises to a minor extent only, since the conductive wrapping comprises metal fibers which are not nobler than the conductor and/or the shield, so that the conductor is not affected by galvanic corrosion.

According to the invention, a number of embodiments of the (conductive) cable wrapping can be used, depending on the nature of the use, i.e. for power or signal cable, comprising swellable material or not, and comprising nonconductive, optionally reinforcing, fibers or not.

DETAILED DESCRIPTION

Figure 1:
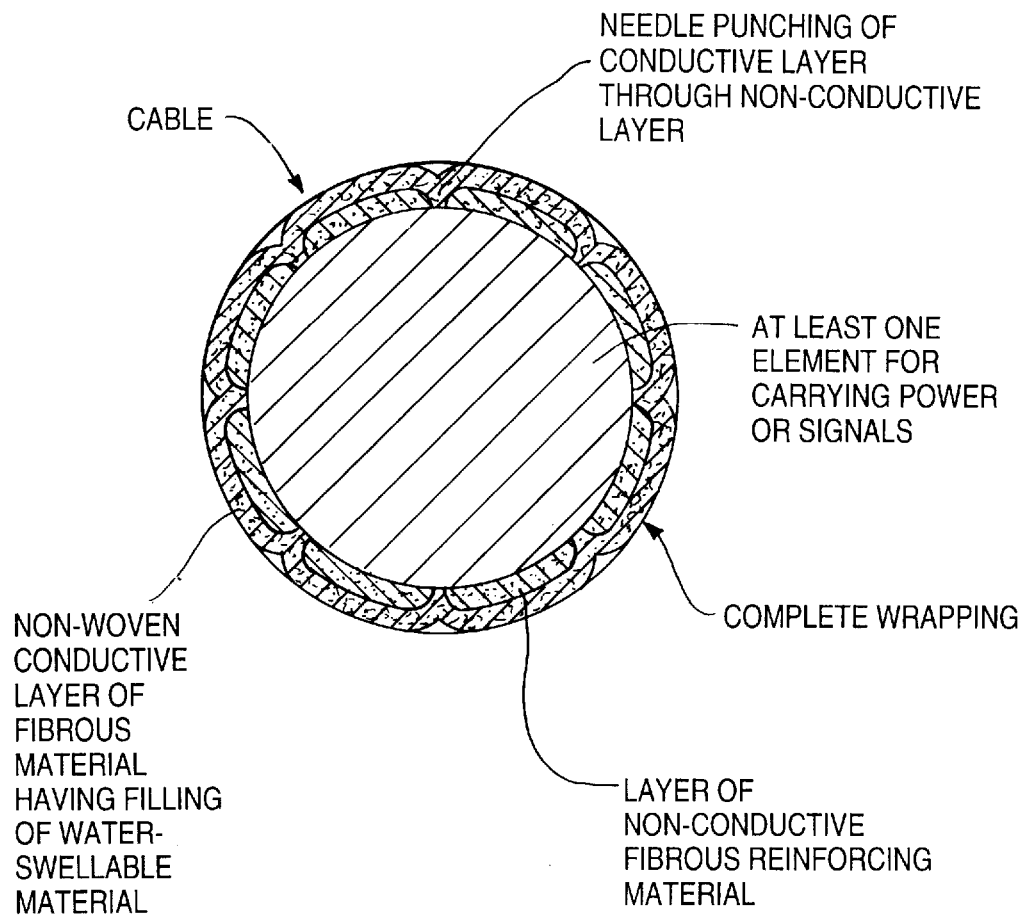
FIG. 1 is a transverse cross-sectional view of a cable provided with a wrapping in accordance with principles of the present invention.

In a first embodiment, the invention relates to the use of a fiber cloth comprising at least one non-conductive or substantially non-conductive, optionally reinforcing, fiber, at least one type of conductive fibrous material and a water-swellable material provided on and/or in the fiber cloth, as cable wrapping.

The invention also relates to the use of an assembly comprising at least one non-conductive or substantially non-conductive fiber cloth and at least one conductive fiber cloth provided on at least one side of the support material, with fibers of the conductive cloth optionally having been carried through the non-conductive fiber cloth into electrically conductive contact with the other side of that fiber cloth, as cable wrapping for providing conductance, shielding, or a combination of the two, in a cable.

The invention further relates to an assembly, i.e. a layered system or laminate, comprising at least one non-conductive or substantially non-conductive fiber cloth and at least one conductive fiber cloth provided on at least one side of the support material, with fibers of the conductive cloth optionally having been carried through the non-conductive fiber cloth into electrically conductive contact with the other side of that fiber cloth, which assembly further comprises a material swellable in or by water ("superabsorber").

The invention also relates to a power or signal cable manufactured utilizing an assembly comprising at least one non-conductive or substantially non-conductive fiber cloth and at least one conductive fiber cloth provided on at least one side of the support material, with fibers of the conductive cloth optionally having been carried through the non-conductive fiber cloth into electrically conductive contact with the other side of that fiber cloth, as cable wrapping for providing conductance, shielding, or a combination of the two, in the cable.

Surprisingly, it has been found that a cable wrapping which is built up from conductive and non-conductive fibers is highly suitable for providing the desired conductive and/or shielding properties in a cable, optionally in combination with a good longitudinal water impermeability. Also, the invention solves the problem of galvanic corrosion resulting from the use of conductive carbon black. Finally, it can be advanced as an advantage that the manufacture of the cable wrapping is much simpler and hence cheaper in a number of cases, because it is often sufficient to use materials which are in fibrous form, so that the cloth (fibrous web) can be manufactured in a single passage. An advantage of the elimination of the use of conductive carbon black is that no additional treatment step is necessary, while at the same time the contamination resulting from the use of carbon black does not arise.

The cable wrapping used according to the invention can comprise a combination of non-conductive, optionally reinforcing, fibers, conductive fibers and a water-swellable material. These three components can be present in a single layer, or in more than a single layer, an assembly or laminate.

As already indicated in the introduction, it is preferred, for the purpose of the power cable, to use a thick wrapping which is properly conductive and, if desired, swells properly upon access of water. For this use, therefore, an assembly is preferred, since not only does it provide the desired thickness but also the extent of swelling is better than with single-layer systems. It is noted that the invention, in respect of the use of multilayer systems, is not limited to the presence of a water-swellable material.

For signal cable a thin wrapping is preferred, both from the point of view of the construction of the cable and from the point of view of the desired shielding, which requires a high density of conductive fibers. For this use, therefore, a single-layer system is preferred. It is true that in that case the swelling is limited, but this is less of a problem with this type of cable.

The cable wrapping which is used according to the invention comprises conductive fibers, optionally in combination with the fibrous materials normally used. In case an assembly is used, it is preferred to use a non-conductive or substantially non-conductive support material with a conductive fiber cloth provided thereon, with the conductive fibers being carried through the support material, for instance by needling. In this manner, conductance is obtained throughout the material. The cable wrapping so manufactured thus acquires a good volume conductance.

The conductive fibers to be used in the fiber cloths to be used according to the invention are the known conductive fibers. Examples include metallized fibers and metal fibers, or fibers comprising conductive additives. When the fiber cloth consists wholly or partly of metal fibers, the metals for the fibers may be selected from the conductive metals and alloys thereof. Examples of suitable metals are steel, aluminum, copper and nickel. When using metallized fibers, it is preferred to use fibers which have been metallized with nickel, aluminum, steel, chromium, zinc, tin, copper or silver, with alloys based on one or more of these metals, or with two or more of these metals in succession. A suitable type of fiber is an acrylic fiber which has been metallized first with copper and then with nickel.

The conductive fiber cloth can consist exclusively of conductive fibers, but it is also possible to use in the cloth a combination of conductive and non-conductive fibers. The length of the conductive fibers can vary within wide limits, depending inter alia on the equipment to be used. To obtain a good conductance, the length is preferably 40–70 mm.

The conductive fibers preferably have an aspect ratio of 500 or more. It will typically be in the neighborhood of 4000–5000.

The amount of conductive fibers should be sufficient to provide the desired electrical properties. This can be determined on the basis of simple experiments. It has been established that for obtaining a good volume conductance, the absolute amount of conductive fibers is of importance, whilst for shielding, the amount per unit thickness is more relevant. Depending on the use, the amount of conductive fibers can be between 0.1 and 100 $g/m^2$, starting from metallized plastic fibers. For other types of fibers, these amounts can be different, depending on weight and conductivity. The skilled worker can determine the desired amounts in a simple manner through routine experiments.

For power cable the amount referred to will preferably be between 0.1 and 20 $g/m^2$, more particularly between 0.25 and 15 $g/m^2$, it being noted that the lower limit is mainly determined by the minimum desired conductance for the operation of the cable wrapping, whilst the upper limits have been set at values above which generally no additional advantages for the conductance are to be expected.

When used in signal cable, the amount of conductive fibers, as stated, should primarily be highly concentrated (high density). This means that either a considerably larger amount of conductive fibers should be used or a thin layer comprising exclusively or substantially exclusively conductive fibers should be used. It can be noted that a thin layer comprising about 65 wt. % conductive fibers provides a shield of 52 dB, whilst in that situation 20 wt. % provides a shield of 37 dB (MIL-STD-285).

Suitable amounts can accordingly be determined on the basis of a few tests. As a guideline, amounts from about 5 $g/m^2$ up to amounts of about 100 $g/m^2$ could be considered.

The fibers to be used for the non-conductive fibrous material include, in particular, acrylic fibers, polyester fibers, glass fibers, carbon fibers, polyamide fibers and aramid fibers. Of course, the choice of the fibers is partly determined by the temperatures and the mechanical load which the materials should be able to withstand during manufacture and use. The conductive fibers, too, can be manufactured from these raw materials, in case fibers are used which have been rendered conductive through metallization or additives.

The cable wrapping, or the support material in the cable wrapping, which is used according to the invention consists of a fiber cloth or a combination of cloths. Such fiber cloths can be wovens, knitted fabrics, non-wovens which may or may not be reinforced, etc. In the case where a monolayer system based on metal fibers, non-conductive fibers and water-swellable material, such as swelling powder, is used, it s preferred that the cable wrapping is a non-woven material.

Fiber cloths provided with microbeads which may or may not be expanded can also be advantageously rendered electrically conductive in accordance with the invention.

The formation of the cloths to be used according to the invention can be realized with all known techniques for fabricating a fibrous cloth, more particularly a non-woven.

In the fabrication of non-wovens, virtually any desired dose can be set accurately and with a uniform distribution by blending conductive fibers with other fibers. This method moreover provides the advantage that the web is fabricated in a single passage through the machine, which constitutes a clear saving. A practical method for the fabrication of a fibrous web which can be used in accordance with the invention, which method provides a uniform fiber distribution, is, for instance, the fabrication of a card web.

The web can be bonded thermally, chemically or mechanically.

The fabrication of an assembly can be realized as follows. A card web as described hereinabove is anchored, for instance by needling, stitching, adhesion or welding, in and through the support material. This anchoring can be obtained, for instance, by means of needling machines or hydro-entanglement plants. Also, by stitching electrically conductive yarns/wires/filaments through the reinforcement material, the armor could be made electrically conductive. All anchoring methods where conductive fibers extend through the reinforcement material are suitable. It is also possible to use a knitting or weaving technique, whereby a so-called 2½- or 3-dimensional knitted fabric or woven fabric is obtained, provided that an electrically conductive wire or yarn is utilized through the cloth. Chemical anchoring can be effected by treatment with a binder, whilst thermal anchoring is effected with a suitable type of fiber or powder.

As stated, the invention also encompasses the use of a cable wrapping comprising water-swellable material, such as swelling powder or swelling fibers. By the use of such water-swellable materials in a wrapping, the cable acquires longitudinal water impermeability, since the swelling material, upon contact with water, closes off the remainder of the cable, thereby preventing further penetration of water along the length of the cable. The use of such water-swellable materials for obtaining longitudinal water impermeability in cable wrapping is already known, though not in combination with the conductive fibers used according to the present invention. Current water-swellable materials are swelling fibers and swelling powder, as described in Jicable 1991, Communication A.7.1, R. S. de Boer and P. Vogel, "The use of waterswellable materials in the design of power cables".

Hereinafter the invention will be further described and illustrated in and by a number of examples, without being limited thereto.

EXAMPLE 1

A fiber blend consisting of 5 wt. % coppered and nickeled acrylic fiber, 70 wt. % swelling fiber based on acrylic fiber and 25 wt. % polyester bico (bi-component) fiber were processed to form a non-woven cable wrapping. The properties thereof are shown in Table 1.

TABLE 1

| Weight | g/m² | 33 |
|---|---|---|
| Thickness | mm | 0.36 |
| Tensile strength | N/cm | 2.0 |
| Elongation | % | 8 |
| Swelling capacity | mm | 2.2 |
| Swelling speed | mm/1st min | 2.1 |
| Moisture content | % | 4.1 |
| Volume resistance (DIN.54345.1; 5 kg) | Ω | 2.0 |

EXAMPLES 2–11

Analogously to Example 1, a number of tests were performed in which, during fabrication of the cable wrapping, the composition of the fiber blend and the process conditions were varied.

Tables 2–11 show the results of these tests.

TABLE 2

| Thermoprint tests | composition | 65% Swelling fiber 30% PES bico fiber 5% Ni—Cu fiber | |
|---|---|---|---|
| | Calender temperature: | 150° C. | |
| | | Calender pressure | |
| Properties | | 100 kN | 200 kN |
| Weight g/m² | | 44.9 | 48.8 |
| Thickness mm | | 0.51 | 0.50 |
| Volume resistance Ω | | 1.2 | 1.2 |

TABLE 2-continued

| Tensile strength N/cm | 1.1 | 1.2 |
|---|---|---|
| Elongation % | 9 | 10 |
| Swelling rate 1st min | 95% | 96% |
| Swelling capacity mm | 2.3 | 2.3 |

TABLE 3

| Thermoprint tests | composition | 70% Swelling fiber 25% PES bico fiber 5% Ni—Cu fiber | | |
|---|---|---|---|---|
| | Pressure: | 100 kN | | |
| | | Calender temperature | | |
| | | 180° C. | 190° C. | 200° C. |
| Weight g/m² | | 44.4 | 43.8 | 50.0 |
| Thickness mm | | 0.51 | 0.50 | 0.55 |
| Volume resistance Ω | | 5 | 10 | 11 |
| Tensile strength N/cm | | 1.1 | 3.7 | 6.6 |
| Elongation % | | 11 | 19 | 30 |
| Swelling rate 1st min | | 98% | 98% | 97% |
| Swelling capacity mm | | 2.0 | 1.6 | 1.5 |

TABLE 4

| Thermoprint tests | composition | 70% Swelling fiber 25% PES bico fiber 5% Ni—Cu fiber | | |
|---|---|---|---|---|
| | Pressure: | 200 kN | | |
| | | Calender temperature | | |
| | | 170° C. | 180° C. | 190° C. |
| Weight g/m² | | 48.0 | 40.5 | 49.1 |
| Thickness mm | | 0.51 | 0.47 | 0.52 |
| Volume resistance Ω | | 2.0 | 2.2 | 2.5 |
| Tensile strength N/cm | | 0.4 | 0.5 | 3.6 |
| Elongation % | | 13 | 11 | 17 |
| Swelling rate 1st min | | 97% | 98% | 96% |
| Swelling capacity mm | | 2.8 | 2.1 | 1.6 |

TABLE 5

| Thermoprint tests | composition | 70% Swelling fiber 30% PES bico fiber 5% Ni—Cu fiber | | |
|---|---|---|---|---|
| | Pressure: | 200 kN | | |
| | | Calender temperature | | |
| | | 160° C. | 180° C. | 200° C. |
| Weight g/m² | | 44.3 | 42.4 | 46.4 |
| Thickness mm | | 0.51 | 0.49 | 0.52 |

TABLE 5-continued

| | | | |
|---|---|---|---|
| Volume resistance Ω | 1.7 | 1.4 | 1.8 |
| Tensile strength N/cm | 0.3 | 1.4 | 8.0 |
| Elongation % | 21 | 10 | 26 |
| Swelling rate 1st min | 98% | 98% | 95% |
| Swelling capacity mm | 3.4 | 1.9 | 1.0 |

TABLE 6

| Thermoprint tests | composition | 70% Swelling fiber 25% PES bico fiber 5% Ni—Cu fiber | | |
|---|---|---|---|---|
| | Pressure: | 200 kN | | |
| | | Calender temperature | | |
| | | 125° C. | 140° C. | 155° C. |
| Weight g/m² | | 42.3 | 42.5 | 46.1 |
| Thickness mm | | 0.49 | 0.54 | 0.51 |
| Volume resistance Ω | | 10 | 20 | 14 |
| Tensile strength N/cm | | 0.2 | 2.2 | 3.3 |
| Elongation % | | 16 | 41 | 42 |
| Swelling rate 1st min | | 97% | 90% | 88% |
| Swelling capacity mm | | 3.4 | 2.0 | 1.8 |

TABLE 7

| Thermoprint tests | composition | 65% Swelling fiber 30% PES bico fiber 5% Ni—Cu fiber | | |
|---|---|---|---|---|
| | Pressure: | 200 kN | | |
| | | Calender temperature | | |
| Data | | 125° C. | 140° C. | 155° C. |
| Weight g/m² | | 47.0 | 44.2 | 48.6 |
| Thickness mm | | 0.54 | 0.56 | 0.52 |
| Volume resistance Ω | | 7 | 11 | 12 |
| Tensile strength N/cm | | 0.4 | 3.4 | 3.8 |
| Elongation % | | 19 | 48 | 37 |
| Swelling rate 1st min | | 92% | 94% | 94% |
| Swelling capacity mm | | 3.0 | 1.8 | 1.7 |

TABLE 8

| Calendar test: | | 95% Swelling fiber; 5% Ni—Cu fiber; | | |
|---|---|---|---|---|
| Pressure | | 100 kN | | |
| | | Calender temperature | | |
| Data | | 170° C. | 180° C. | 190° C. |
| Weight g/m² | | 40.6 | 42.0 | 44.4 |
| Tensile strength N/cm | | 9.6 | 9.6 | 11.6 |
| Elongation % | | 1.9 | 1.9 | 2.2 |
| Volume resistance Ω | | <0.5 | <0.5 | <0.5 |
| Swelling rate 1st min | | 99% | 98% | 99% |
| Swelling capacity mm | | 4.5 | 4.5 | 4.2 |

TABLE 9

| Calendar test: | | 80% Swelling fiber; 15% PES fiber; 5% Ni—Cu fiber; | | |
|---|---|---|---|---|
| Pressure | | 100 kN | | |
| | | Calender temperature | | |
| | | 170° C. | 180° C. | 190° C. |
| Weight g/m² | | 43.0 | 41.8 | 38.6 |
| tensile strength | | 7.4 | 9.7 | 9.2 |
| Elongation % | | 2.0 | 2.3 | 2.6 |
| Volume resistance Ω | | <0.5 | <2 | <1 |
| Swelling rate 1st min | | 91% | 91% | 91% |
| Swelling capacity mm | | 2.6 | 1.9 | 1.8 |

TABLE 10

| Calender tests: | | 65% Swelling fiber; 30% PES fiber; 5% Ni—Cu fiber; | | |
|---|---|---|---|---|
| | | Pressure 100 kN | | |
| | | Calender temperature | | |
| | | 170° C. | 180° C. | 190° C. |
| Weight g/m² | | 38.6 | 39.2 | 38.6 |
| Tensile strength N/cm | | 6.4 | 11.0 | 11.1 |
| Elongation % | | 24 | 18 | 17 |
| Volume resistance Ω | | <2 | <2 | <2 |
| Swelling rate in 1st min | | 89% | 91% | 93% |
| Swelling capacity mm | | 1.7 | 1.3 | 1.1 |

TABLE 11

| Calender tests: | | 65% Swelling fiber; 30% PES fiber; 5% Ni—Cu fiber; | | | |
|---|---|---|---|---|---|
| | | Pressure 100 kN | | | |
| | | Calender temperature | | | |
| | | 120° C. | 130° C. | 140° C. | 150° C. |
| Weight g/m² | | 43.4 | 44.2 | 43.2 | 44.2 |
| Tensile strength | | 7.8 | 7.3 | 6.6 | 6.6 |
| Elongation % | | 43 | 39 | 36 | 30 |
| Swelling rate 1st min | | 71% | 75% | 80% | 80% |
| Swelling capacity mm | | 1.7 | 1.6 | 1.5 | 1.5 |

EXAMPLE 12

A fibrous web comprising 10 wt. % of coppered and nickeled acrylic fiber was applied to a swelling web (3E116/

Firet™ Cable wrapping) through needling. The properties of the material obtained are summarized in Table 12.

TABLE 12

| Weight | (g/m²) | 228 |
| --- | --- | --- |
| Thickness | (mm) | 2.1 |
| Tensile strength | (N/cm) | 20 |
| Elongation | (%) | 12 |
| Swelling capacity | (mm) | 17 |
| Swelling speed | (mm/1st min) | 5 |
| Volume resistance | (Ω) | <1.0* |

*: Lower limit of measuring range

EXAMPLE 13

A card web of a weight of 20 g/m² was placed and needled on a polyester spunbond of about 70 g/m². The card web contains about 65 wt. % metallized fibers (coppered and nickeled acrylic fiber) and about 35 wt. % unstretched polyester fibers. The needled composite material is then calendered, whereby the density of the product is strongly increased. In the same manner as described hereinabove, a product is fabricated comprising about 20 wt. % metallized fibers in the card web of 20 g/m². The shielding action of the two webs is shown in Table 13.

TABLE 13

| Content of metallized fiber in 20 g/m² card web | Shielding (dB)** | | | |
| --- | --- | --- | --- | --- |
| | 400 MHz | 600 MHz | 800 MHz | 1000 MHz |
| 65 g/m² | 47 | 47 | 52 | 50 |
| 20 g/m² | 32 | 32 | 37 | 35 |

**: Determined according to MIL-STD-285

EXAMPLES 14 and 15

A number of conductive swelling webs were applied to a spunbond support of 25 g/m² by needling. In the first series of tests a conductive swelling web was used comprising 99 wt. % superabsorbing fiber based on acrylic fiber and 1 wt. % coppered and nickeled acrylic fiber (Table 14). In the second series of tests, this ratio was 90/10 (Table 15).

In both series of tests, the amount of needled-on conductive swelling web was varied. Tables 14 and 15 show the results.

TABLE 14

| Weight g/m² | Thickness mm | Dens. g/cm³ | Vol. res. Ω | Swell sp 1 min (mm/min) | Swell height mm |
| --- | --- | --- | --- | --- | --- |
| 90 | 0.26 | 0.346 | 7 | 3.9 | 4.0 |
| 104 | 0.25 | 0.416 | 15 | 4.8 | 5.4 |
| 106 | 0.26 | 0.408 | 19 | 4.8 | 5.0 |
| 118 | 0.26 | 0.454 | 7 | 5.4 | 6.0 |
| 118 | 0.27 | 0.437 | 30 | 5.4 | 6.0 |

TABLE 15

| Weight g/m² | Thickness mm | Dens. g/cm³ | Vol. res. Ω | Swell speed 1 min (mm/min) | Swell height mm |
| --- | --- | --- | --- | --- | --- |
| 86 | 0.23 | 0.374 | 1.3 | 3.7 | 3.9 |

TABLE 15-continued

| Weight g/m² | Thickness mm | Dens. g/cm³ | Vol. res. Ω | Swell speed 1 min (mm/min) | Swell height mm |
| --- | --- | --- | --- | --- | --- |
| 100 | 0.25 | 0.400 | 1.3 | 3.9 | 4.1 |
| 114 | 0.27 | 0.422 | 1.3 | 4.2 | 4.4 |
| 116 | 0.28 | 0.414 | 1.3 | 4.0 | 4.3 |
| 120 | 0.29 | 0.414 | 1.3 | 4.3 | 4.5 |
| 120 | 0.27 | 0.444 | 1.3 | 4.3 | 4.5 |
| 122 | 0.27 | 0.452 | 1.3 | 4.2 | 4.5 |
| 126 | 0.29 | 0.434 | 1.3 | 4.5 | 5.2 |
| 132 | 0.26 | 0.508 | 1.3 | 4.1 | 4.5 |
| 132 | 0.27 | 0.489 | 1.3 | 4.1 | 4.5 |

We claim:

1. A cable comprising:
   at least one element extending longitudinally of the cable and adapted to carry at least one of electrical power and signals along the cable; and
   wrapping completely peripherally surrounding said at least one element; said wrapping comprising a first layer of nonconductive material and a second layer of non-woven fibrous material which is electrically conductive; said second layer being needle punched through said first layer, so that said wrapping provides at least one of volume electrical conductance and electromagnetic shielding for said cable, with said electrical conductance being on both an inner and an outer side of said wrapping.

2. The cable of claim 1, wherein said wrapping further includes at least one of:
   a water-swellable material; and
   a substantially non-conductive fibrous material.

3. The cable of claim 2, wherein:
   the water-swellable material is provided as at least one of powder and fiber.

4. The cable of claim 2, wherein:
   the substantially non-conductive fibrous material reinforces said wrapping.

5. The cable of claim 4, wherein:
   said substantially non-conductive fibrous material is made of fibers selected from the group consisting of glass, polyester, carbon, polyamide, aramid, acrylic, and blends thereof.

6. The cable of claim 2, wherein: said first layer of nonconductive material comprising said substantially non-conductive fibrous material and connected with said second layer of non-woven fibrous material which is electrically conductive.

7. The cable of claim 1, wherein;
   said non-woven layer of fibrous material comprises at least one of metal fibers and fibers metalized using at least one metal selected from the group consisting of nickel, aluminum, steel, chromium, copper, zinc, tin, silver, and alloys thereof.

8. A cable, comprising:
   at least one electrically conductive element extending longitudinally of the cable; and
   wrapping peripherally surrounding said element; said wrapping comprising an inner insulative layer, and an outer layer of non-woven material having conductive fibers, said outer layer being needle punched through said inner layer so that electrical conductance is on both an inner and outer side of said wrapping.

* * * * *

UNITED STATES PATENT AND TRADEMARK OFFICE
CERTIFICATE OF CORRECTION

PATENT NO. : 5,817,974
DATED : October 6, 1998
INVENTOR(S) : Bovenschen et al.

It is certified that error appears in the above-identified patent and that said Letters Patent is hereby corrected as shown below:

On the title page, item [73], insert the following:
--Assignee: Lantor B.V.
Veenendaal, The Netherlands.--

Signed and Sealed this

Sixth Day of July, 1999

Q. TODD DICKINSON

*Attest:*

*Attesting Officer*  Acting Commissioner of Patents and Trademarks